(12) United States Patent
Hastings et al.

(10) Patent No.: US 7,757,049 B2
(45) Date of Patent: Jul. 13, 2010

(54) METHOD AND SYSTEM FOR FILE ACCESS USING A SHARED MEMORY

(75) Inventors: Andrew B. Hastings, Eagan, MN (US); Anton B. Rang, Houlton, WI (US); Alok N. Choudhary, Chicago, IL (US)

(73) Assignee: Oracle America, Inc., Redwood City, CA (US)

( * ) Notice: Subject to any disclaimer, the term of this patent is extended or adjusted under 35 U.S.C. 154(b) by 596 days.

(21) Appl. No.: 11/601,517

(22) Filed: Nov. 17, 2006

(65) Prior Publication Data

US 2008/0120476 A1    May 22, 2008

(51) Int. Cl.
*G06F 12/02*    (2006.01)

(52) U.S. Cl. .................... 711/148; 710/53; 711/153; 711/209

(58) Field of Classification Search ................ None
See application file for complete search history.

(56) References Cited

U.S. PATENT DOCUMENTS

| | | | |
|---|---|---|---|
| 6,351,744 B1* | 2/2002 | Landresse | 707/8 |
| 2008/0215852 A1* | 9/2008 | Largman et al. | 712/28 |

OTHER PUBLICATIONS

The Open Group Base Specifications Issue 6; IEEE Std 1003.1, 2004 Edition, Publication Apr. 2004, Copyright 2001-2004 The IEEE and The Open Group; 8 pages.

Worringen, J. et al.; "Fast Parallel Non-Contiguous File Access"; Proceedings of SC2003: High Performance Networking and Computing; IEEE Computer Society Press, Nov. 2003; pp. 1-18.
Thakur, R. et al.; "Data Sieving and Collective I/O in ROMIO"; Proceedings of the Seventh Symposium on the Frontiers of Massively Parallel Computation; IEEE Computer Society Press, Feb. 1999, pp. 182-189.
Ross, R. et al.; "Implementing Fast and Reusable Datatype Processing"; Proceedings of the 10th European PVM/MPI Users Group Meeting, Springer-Verlag, Oct. 2003, pp. 404-413.
Worringen, J. et al.; "Exploiting Transparent Remote Memory Access for Non-Contiguous- and One-Sided-Communication"; Proceedings of the International Parallel and Distributed Processing Symposium; IEEE Computer Society Press, Apr. 2002; pp. 163-172.
Ching, A. et al.; "Efficient Structured Data Access in Parallel File Systems"; Proceedings of the IEEE International Conference on Cluster Computing (Cluster'03); IEEE Computer Society Press, Dec. 2003; pp. 326-335.

* cited by examiner

*Primary Examiner*—Gary J Portka
(74) *Attorney, Agent, or Firm*—Osha • Liang LLP

(57) ABSTRACT

A method for processing using a shared file that includes allocating a first working buffer between the shared file and a plurality of address spaces, wherein each of the plurality of address spaces is associated with one of a plurality of processors, copying first data from the shared file to the first working buffer by a first aggregator copying the first data from the first working buffer to the plurality of address spaces by the first aggregator, processing the first data, in parallel, by the plurality of processors to obtain a result, wherein the plurality of processors access data from the plurality of address spaces, and storing the result in the shared memory.

19 Claims, 11 Drawing Sheets

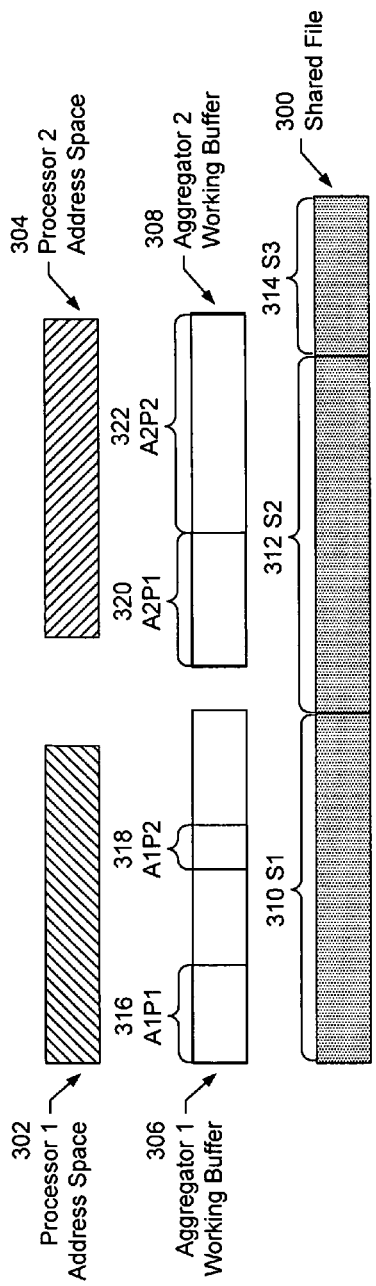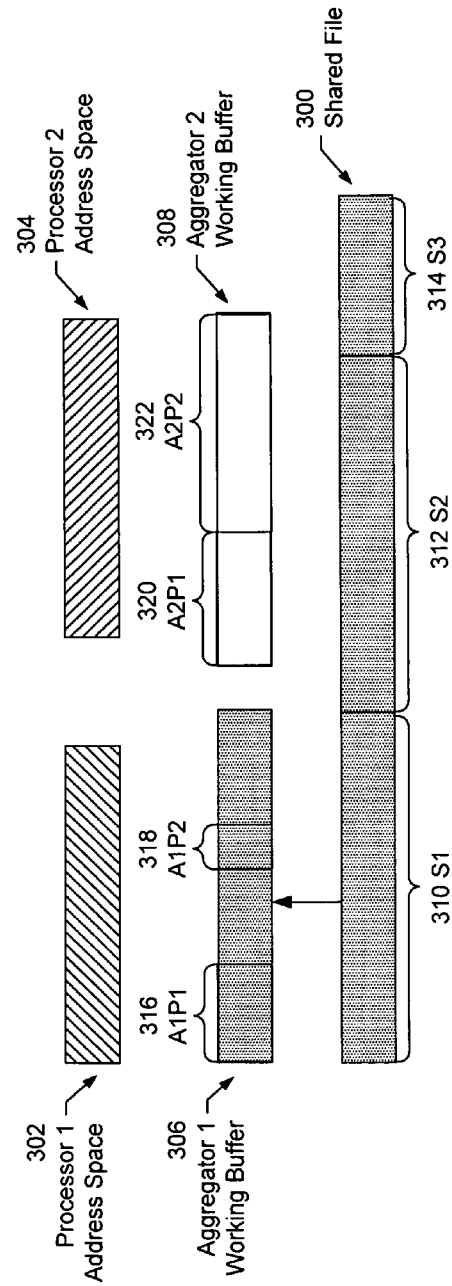
FIGURE 9A
FIGURE 9B

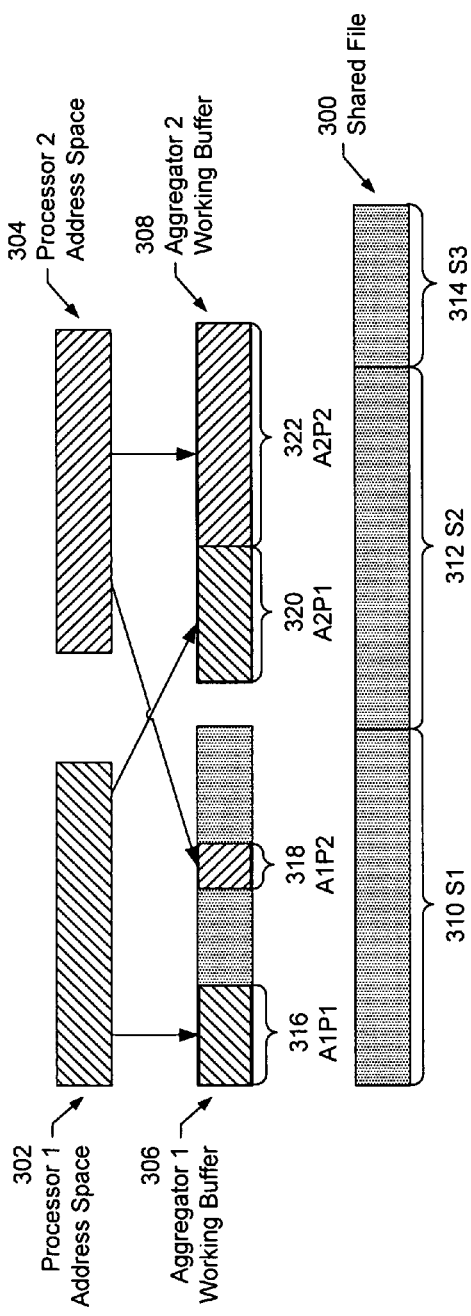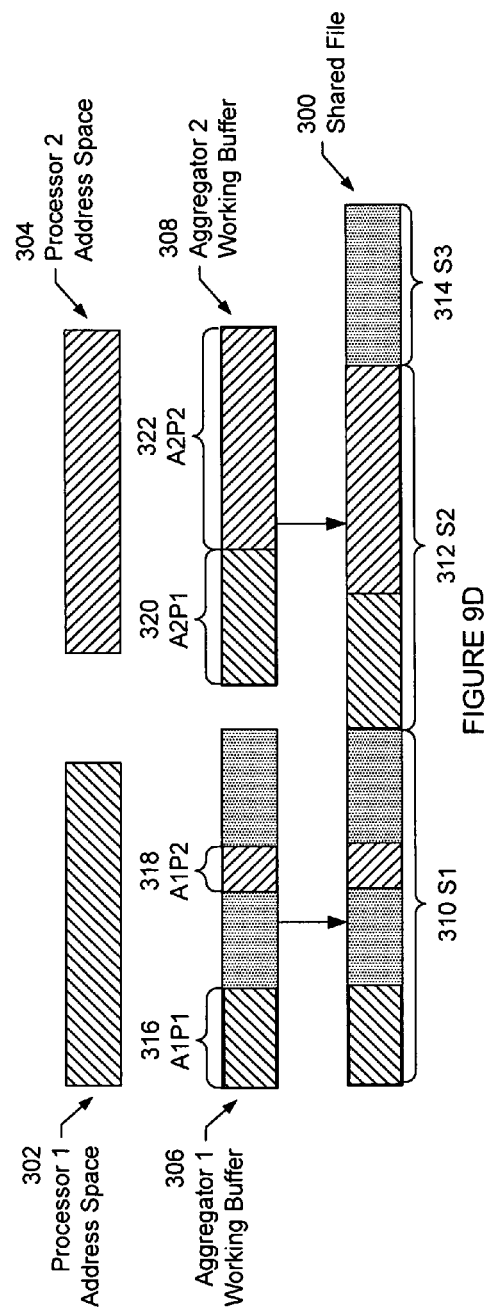

US 7,757,049 B2

METHOD AND SYSTEM FOR FILE ACCESS USING A SHARED MEMORY

STATEMENT REGARDING FEDERALLY SPONSORED RESEARCH OR DEVELOPMENT

The present invention was made with the support of the government of the United States under contract NBCH3039002 awarded by the Defense Advanced Research Projects Administration. The United States government may have certain rights in the present invention.

BACKGROUND

A shared memory multiprocessor system includes multiple interconnected processors that share a common memory. The interconnection and the processing power provided by the shared memory multiprocessor system decreases the amount of time required to execute an application. From the perspective of the application, the application may be designed such that portions of the application may execute in parallel by the processors in the shared memory multiprocessor system.

For example, consider the scenario in which an application is designed to calculate the amount of precipitation across a region based upon a set of measured amounts of precipitation that are dispersed throughout the region. In such a scenario, the application may be designed such that each processor in the shared memory multiprocessor system calculates the precipitation for a sub-region of the region. If, for example, the shared memory multiprocessor system has four processors, then each processor may determine the precipitation for one quarter of the region. The processors may obtain and collate data using an initialization step and a finalization step. Further, during calculations, processors responsible for neighboring sub-regions may communicate calculations for the borders of the sub-region.

SUMMARY

In general, in one aspect, the invention relates to a method for processing using a shared file that includes allocating a first working buffer between the shared file and a plurality of address spaces, wherein each of the plurality of address spaces is associated with one of a plurality of processors, copying first data from the shared file to the first working buffer by a first aggregator copying the first data from the first working buffer to the plurality of address spaces by the first aggregator, processing the first data, in parallel, by the plurality of processors to obtain a result, wherein the plurality of processors access data from the plurality of address spaces, and storing the result in the shared memory.

In general, in one aspect, the invention relates to a method for processing using a shared file that includes allocating a first working buffer between the shared file and a plurality of address spaces, wherein each of the plurality of address spaces is associated with one of a plurality of processors, copying first data from the shared file to first working buffer by a first aggregator, copying the first data directly from the first working buffer to the plurality of address spaces by the plurality of processors, processing the first data, in parallel, by the plurality of processors to obtain a result, wherein the plurality of processors access data from the plurality of address spaces, and storing the result in the shared memory.

In general, in one aspect, the invention relates to a computer program product that includes computer readable program code for causing a shared memory computer system to allocate a first working buffer between a shared file and a plurality of address spaces, wherein each of the plurality of address spaces is associated with one of a plurality of processors, allocate a second working buffer between the shared file and the plurality of address spaces, copy first data directly from at least two of the plurality of address spaces to the first working buffer by the plurality of processors, copy second data directly from at least two of the plurality of address spaces to the second working buffer by the plurality of processors, copy the first data from first working buffer to the shared file by a first aggregator, and copy the second data from second working buffer to the shared file by a second aggregator.

Other aspects of the invention will be apparent from the following description and the appended claims.

BRIEF DESCRIPTION OF DRAWINGS

FIGS. 9A-9D show an example in accordance with one or more embodiments of the invention.

DETAILED DESCRIPTION

Figure 1:
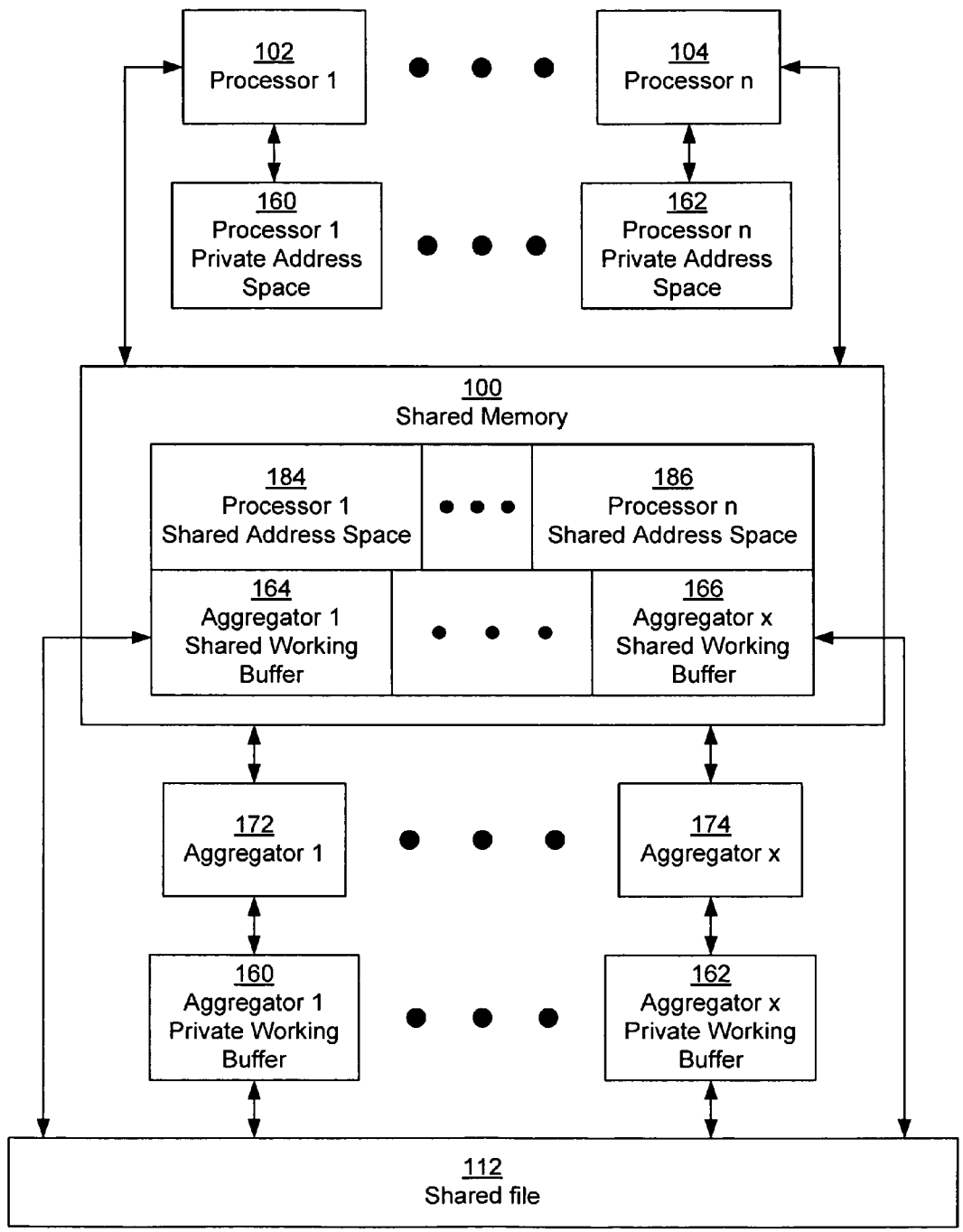
FIGS. 1-2 show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for transferring data from a shared file to the address spaces of multiple processors using a working buffer and/or address spaces. Specifically, in one or more embodiments of the invention, data may be simultaneous transferred between the buffers and the processors' address spaces. Further, data may be transferred between buffers and the address spaces by multiple aggregators in accordance with one or more embodiments of the invention.

Figure 2:
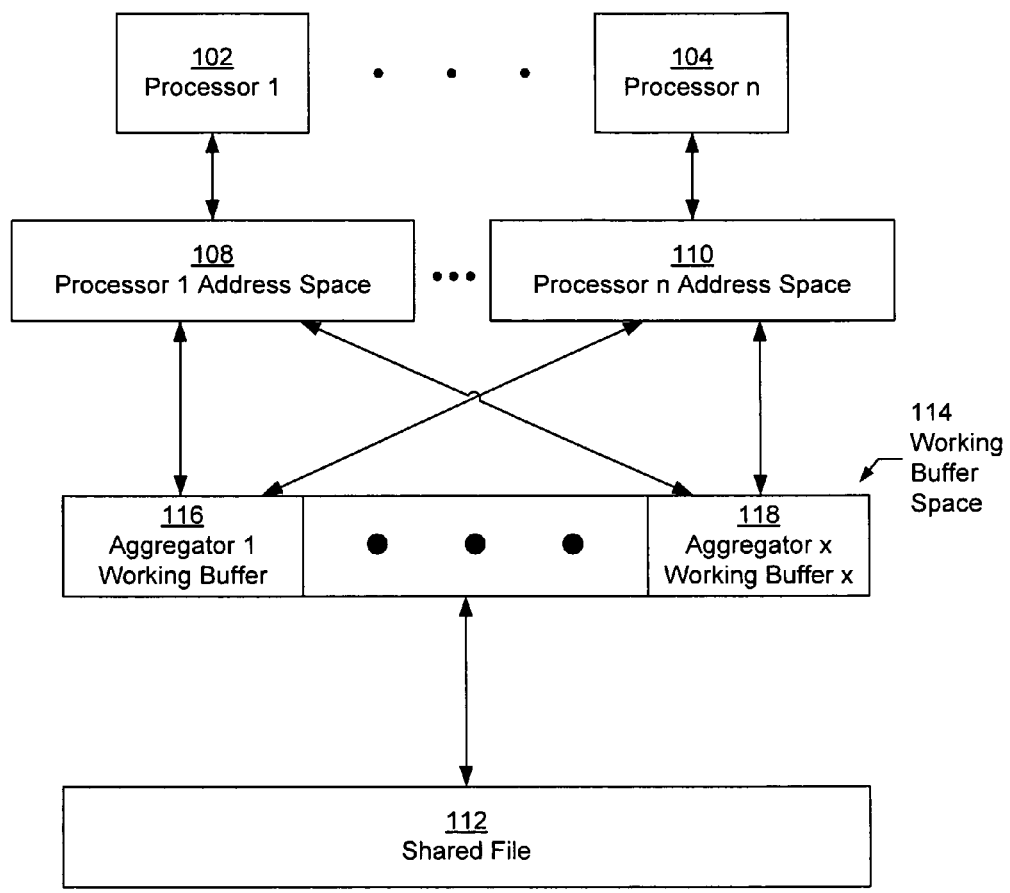

FIGS. 1-2 show a schematic diagram of a system for file access in accordance with one or more embodiments of the invention. FIG. 1 shows a shared memory computer system in accordance with one or more embodiments of the invention. As shown in FIG. 1, the shared memory computer system includes processors (e.g., processor 1 (102), processor n (104)), aggregators (e.g., aggregator 1 (172), aggregator x (166)), shared memory (100), and a shared file (112). Each of these components is described below.

A processor (e.g., processor 1 (102), processor n (104)) corresponds to any type of entity that may be used to process instructions. The processor (e.g., processor 1 (102), processor n (104)) may include functionality to perform operations specified by an application including functionality to initialize an application. Specifically, in one or more embodiments of the invention, initializing execution of an application may involve specifying multiple processors, which execute portions of the application in parallel. In order to execute portions of the application, each processor may have one or more instances of the application stored in memory associated with the processor that the processor includes functionality to execute. The instance(s) of the application executing on a particular processor may be designed or compiled so as to specify the portion of the application (or problem space) for which the particular processor is responsible.

For example, when initializing execution of the application across the processors, each processor may be associated with an identifier. The instructions of the application may specify the identifier corresponding to the processor which is to execute the instruction. Thus, a processor (e.g., processor 1 (102), processor n (104)) executing an instance of the application may execute only the instructions associated with the identifier corresponding to the processor (e.g., processor 1 (102), processor n (104)).

Each processor (e.g., processor 1 (102), processor n (104)) is connected to a processor's private address space in accordance with one or more embodiments of the invention (e.g., processor 1 private address space (160), processor n private address space (162)). A processor's private address space (e.g., processor 1 private address space (160), processor n private address space (162)) corresponds to a storage area reserved for a processor. Specifically, a processor's private address space (e.g., processor 1 private address space (160), processor n private address space (162)) is only accessible by the processor (e.g., processor 1 (102), processor n (104)) that owns the processor's private address space in accordance with one or more embodiments of the invention.

In addition to processors (e.g., processor 1 (102), processor n (104)), the shared memory computer system may also include aggregators (e.g., aggregator 1 (172), aggregator x (174)) in accordance with one or more embodiments of the invention. An aggregator includes functionality to transfer data between the shared file (112) and a working buffer (e.g., aggregator 1 private working buffer (160), aggregator x private working buffer (162), aggregator 1 shared working buffer (164), aggregator x shared working buffer (166)) (discussed below). In one or more embodiments of the invention, the aggregator(s) (e.g., aggregator 1 (172), aggregator x (174)) may correspond to a subset of the processors (e.g., processor 1 (102), processor n (104)). Alternatively, the aggregator (e.g., aggregator 1 (172), aggregator x (174)) may correspond to a separate component within the system.

In one or more embodiments of the invention, each aggregator (e.g., aggregator 1 (172), aggregator x (174)) is exclusively responsible for a contiguous part of the shared file (112). A shared file (112) corresponds to an interrelated storage area that is shared amongst the aggregators (e.g., aggregator 1 (172), aggregator x (174)) and has portions required by the processors (e.g., processor 1 (102), processor n (104)) to execute the application. The shared file may be stored on hard disk, random access memory (RAM), etc.

Sharing the shared file (112) amongst the aggregators may include partitioning the shared file (112) into parts in which each part is associated with a single aggregator (e.g., aggregator 1 (172), aggregator x (174)) that performs the transfer to/from the part. Further, the partitioning of the shared file (112) may vary according to the data transfer. For example, the shared file (112) may be partitioned in one manner for a first read operation and partitioned differently for a second read or, alternatively, a write operation.

Each aggregator (e.g., aggregator 1 (172), aggregator x (174)) is connected to the aggregator's private working buffer (e.g., aggregator 1 private working buffer (160), aggregator x private working buffer (162)). An aggregator's private working buffer (e.g., aggregator 1 private working buffer (160), aggregator x private working buffer (162)) corresponds to a temporary storage area for transferring data. In one or more embodiments of the invention, the aggregator's private working buffer (e.g., aggregator 1 private working buffer (160), aggregator x private working buffer (162)) is accessible only by the aggregator (e.g., aggregator 1 (172), aggregator x (174)).

Continuing with FIG. 1, the processors (e.g., processor 1 (102), processor n (104)) and the aggregators (e.g., aggregator 1 (172), aggregator x (174)) are connected to a shared memory (100). In one or more embodiments of the invention, shared memory (100) corresponds to any type of storage unit for storing data. Shared memory (100) may be divided into multiple processor shared address spaces (e.g., processor 1 shared address space (184), processor n shared address space (186)), and/or multiple working buffers (e.g., aggregator 1 shared working buffer (164), aggregator x shared working buffer (166)).

Each processor shared address space (e.g., processor 1 shared address space (184), processor n shared address space (186)) corresponds to a region of the shared memory (100) that is accessible by the owning processor (e.g., processor 1 (102), processor n (104)) and one or more aggregators (e.g., aggregator 1 (172), aggregator x (174)). For example, processor 1 shared address space (184) may be accessed by process 1 (102), aggregator 1 (172), and aggregator x (174).

Each shared working buffer (e.g., aggregator 1 shared working buffer (164), aggregator x shared working buffer (166)) corresponds to a region of the shared memory (100) that is accessible by the owning aggregator (e.g., aggregator 1 (172), aggregator x (174)) and one or more processors (e.g., processor 1 (102), processor n (104)). For example, aggregator 1 shared working buffer (164) may be accessed by aggregator 1 (172), processor 1 (102), and processor n (104) in accordance with one or more embodiments of the invention.

FIG. 2 shows a schematic diagram of a system for file access using a working buffer in accordance with one or more embodiments of the invention. Specifically, FIG. 2 shows a schematic diagram of connections for data transfer in accordance with one or more embodiments of the invention. As shown in FIG. 2, interposed between the processors' address space (e.g., processor 1 address space (108), processor n address space (110)) and the shared file (112) is a buffer space (114) in accordance with one or more embodiments of the invention. A buffer space (114) corresponds to a storage area used to transfer data between a particular processor's address space (e.g., processor 1 address space (108), processor n address space (110)) and a shared file (112). In one embodiment of the invention, the buffer space may be stored on Random Access Memory (RAM), hard disk, etc. in the shared memory.

In one or more embodiment of the invention, the buffer space (114) includes one or more working buffers (e.g., working buffer 1 (116), working buffer x (118)). The working buffer corresponds to either the aggregator's private working buffer (described in FIG. 1 and corresponding text) or the aggregator's shared working buffer (described in FIG. 1 and corresponding text).

Continuing with FIG. 2, in one or more embodiments of the invention, In addition to the shared address space (106), the shared memory (100) also includes processor address space (e.g., processor 1 address space (108), processor n address space (110)) for two or more processors (e.g., processor 1 (102), processor n (104)). The processor's address space (e.g., processor 1 address space (108), processor n address space (110)) may either correspond to the processor's private address space (described in FIG. 1 associated text) or the processors shared address space (described in FIG. 1 associated text) in accordance with one or more embodiments of the invention.

Specifically, in one or more embodiments of the invention, if the aggregator's working buffer corresponds to an aggregator's shared working buffer, then a processor address space corresponds to the processor's private address space. Conversely, if the aggregator's working buffer corresponds to an aggregator's private working buffer, then the processor address space corresponds to the processor's shared address space in accordance with one or more embodiments of the invention.

The processor address space (e.g., processor 1 address space (108), processor n address space (110)) (shared or private address space) corresponds to a storage area for any instance of one or more applications executing on each processor. Thus, the processor address space (e.g., processor 1 address space (108), processor n address space (110)) may be further subdivided into separate address spaces for each instance of the application executing on the processor. In one or more embodiments of the invention, the division of the processor address space dedicated to an instance of an application may be overwritten when the application halts execution.

Continuing with FIG. 2, data may be simultaneously transferred between multiple processors' address spaces (e.g., processor 1 address space (108), processor n address space (110)) and each working buffer (e.g., working buffer 1 (116), working buffer x (118)). In one or more embodiments of the invention, an aggregator for a working buffer may access multiple processors' shared address spaces and the working buffer (e.g., working buffer 1 (116), working buffer x (118)). Further, if multiple working buffers exist, then multiple aggregators may simultaneously access the same processors' shared address space in accordance with one or more embodiments of the invention.

Alternatively, in one or more embodiments of the invention, multiple processors (e.g., processor 1 (100), processor n (102)) may have simultaneous permissions to access any portion of a single shared working buffer (e.g., working buffer 1 (116), working buffer x (118)). Specifically, multiple processors may simultaneously transfer data between their respective processors' address spaces to a common shared working buffer.

Transferring data simultaneously between a particular processor's address space and a working buffer and between the working buffer and the shared file may be performed using sub-buffers. In one embodiment of the invention, a sub-buffer corresponds to a sub-division of a working buffer (e.g., working buffer 1 (116), working buffer x (118)). Sub-buffers are described below in FIGS. 3-6.

Figure 3:
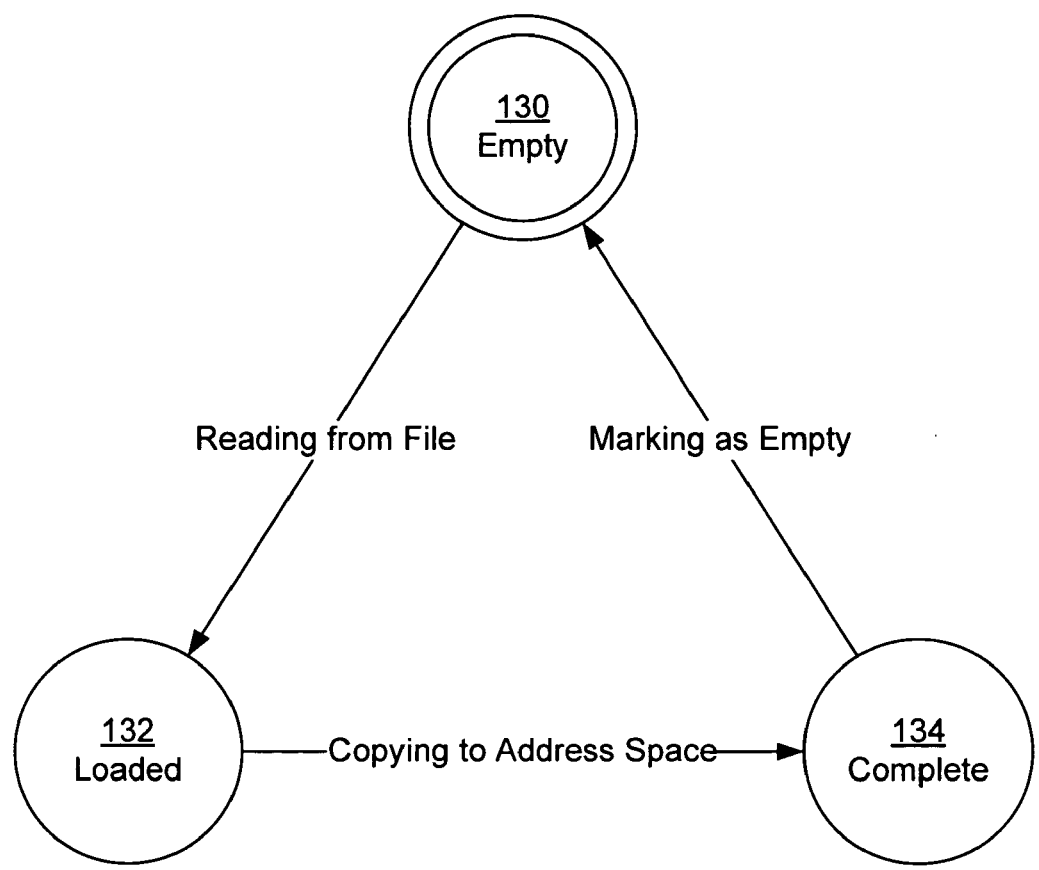
FIGS. 3-6 show diagrams of a working buffer with sub-buffers in accordance with one or more embodiments of the invention.

FIGS. 3-6 show diagrams of a working buffer with sub-buffers in accordance with one or more embodiments of the invention. FIG. 3 shows a state transition diagram in a read operation for sub-buffers in accordance with one or more embodiments of the invention. As shown in FIG. 3, sub-buffers may be in an empty state (130), a loaded state (132), or a complete state (134). A sub-buffer is in the empty state (130) when the sub-buffer is marked as empty. Any data in a sub-buffer, which is in the empty state (130), may be overwritten. Sub-buffers in the empty state may be transitioned to the loaded state (132) by reading data from a shared file. A sub-buffer is in the loaded state (132) when the sub-buffer is currently storing data from the shared file and is waiting for the data to be copied from the sub-buffer. When the initialization of copying data to the processor's address space occurs, the sub-buffer transitions to a complete state (134). In the complete state (134), all data required from the sub-buffer has been copied to a processor's address space. Thus, a sub-buffer in the complete state (134) is waiting to be marked as empty in order to transition to the empty state (130). After a sub-buffer in the complete state (134) is marked as empty, the sub-buffer is transitioned to the empty state (130).

Figure 4:
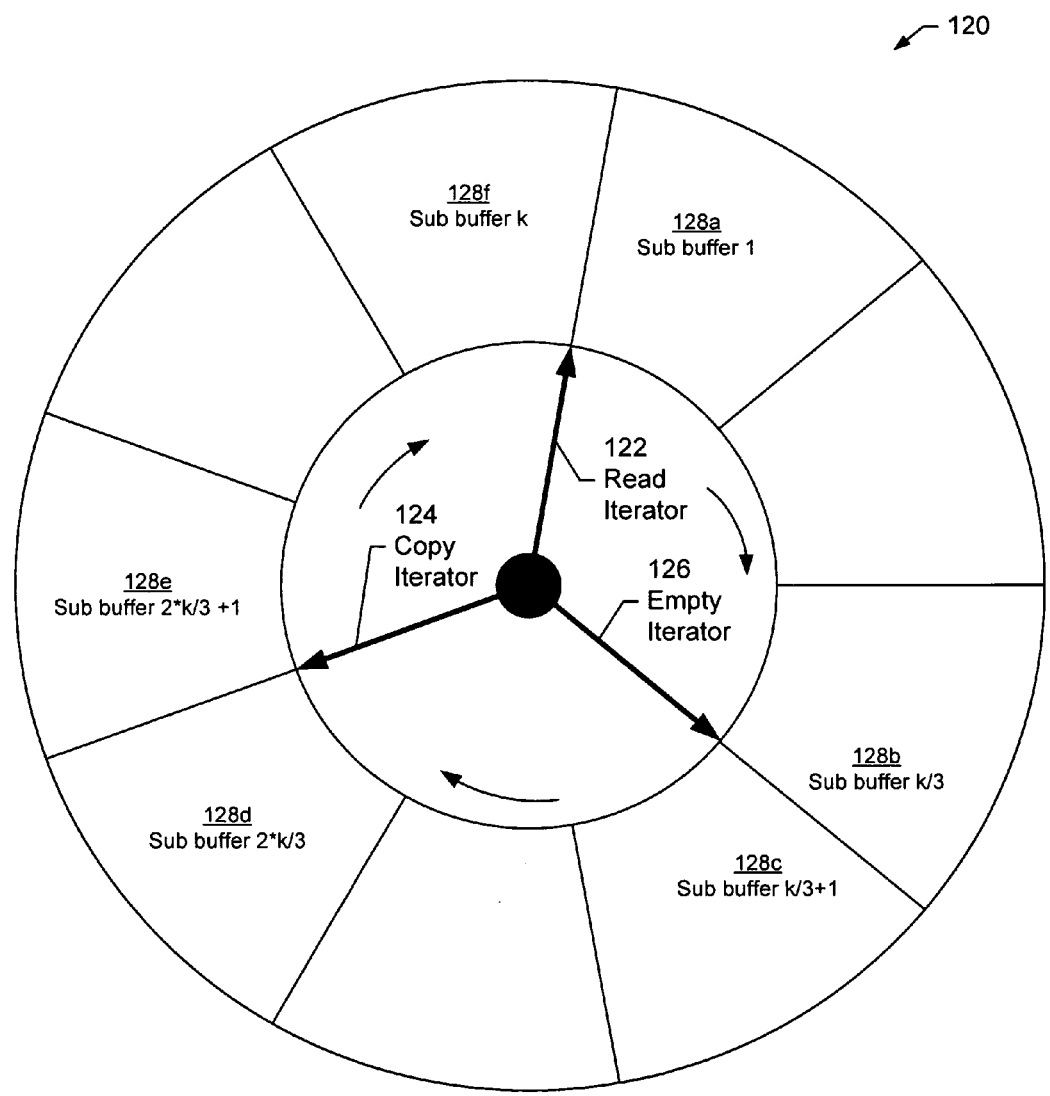

Transitioning the sub-buffers between states may be performed as described below and in FIG. 4. FIG. 4 shows a schematic diagram of a working buffer (120) sub-divided into k sub-buffers (128) for a read operation in accordance with one or more embodiments of the invention.

As shown in FIG. 4, a working buffer includes multiple iterators (e.g., read iterator (122), copy iterator (124), empty iterator (126)) and sub-buffers (128a-f) in accordance with one or more embodiments of the invention. The iterators (e.g., read iterator (122), copy iterator (124), empty iterator (126)) include functionality to initialize the transition of a sub-buffer (e.g., 128a-f) from one state to the next state. Each sub-buffer (e.g., sub-buffer 1 (128a), sub-buffer k/3 (128b), sub-buffer k/3+1 (128c), sub-buffer 2*k/3 (128d), sub-buffer 2*k/3+1 (128e), sub-buffer k (128f)) corresponds to a division of the working buffer in which all memory within the sub-buffer is presumed to have the same processes being performed on the data or have been performed on the data. For example, in FIG. 4, sub-buffers between sub-buffer k (128f) and sub-buffer 2*k/3+1 (128e) are presumed to include data from the shared file or in the processes of receiving data from the shared file.

In one or more embodiments of the invention, for a read operation, three possible processes that may be performed on a sub-buffer (128a-f) are: emptying, loading, and copying. A sub-buffer is emptying when the sub-buffer is waiting to receive data from the shared file but no desired data is in the sub-buffer. A sub-buffer is loading when the sub-buffer is receiving data from the shared file. A sub-buffer is copying when the data is being copied from the shared file to a processor's address space.

Continuing with FIG. 4, the iterators (e.g., read iterator (122), copy iterator (124), empty iterator (126)) correspond to indicators of the process being performed on the sub-buffer. Each iterator includes functionality to initialize transitioning between states on the sub-buffer. Thus, sub-buffers between the empty iterator (126) and the read iterator (122) are emptying (e.g., sub-buffer 1 (128a), sub-buffer k/3 (128b)). Further, data is being loaded from the shared file into sub-buffers between the read iterator (122) and the copy iterator (124) (e.g., sub-buffer 2*k/3+1 (128e), sub-buffer k (128f)). Finally, data in the sub-buffers between the copy iterator (124) and the empty iterator (126) is being copied the sub-buffers to address space associated with one or more processors (e.g., k/3+1 (128c), sub-buffer 2*k/3 (128d)).

In one or more embodiments of the invention, as the iterator rotates clockwise, the next sub-buffer begins transitioning to the next state. For example, in the diagram shown in FIG. 4, in the next iteration, the read iterator (122) initializes a read on sub-buffer 1 (128a), the copy iterator (124) initializes a copy on sub-buffer 2*k/3+1 (128e), and the empty iterator (126) marks sub-buffer k/3+1 (128c) as empty.

Figure 5:
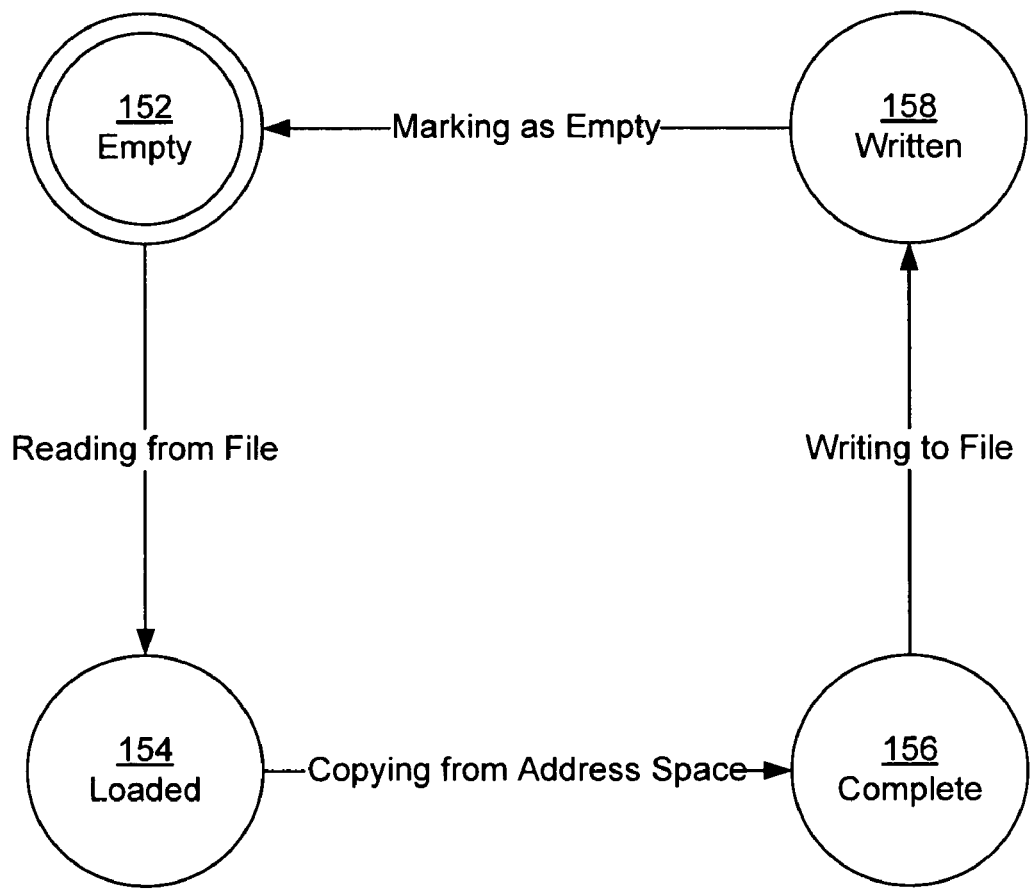

FIG. 5 shows a state transition diagram for sub-buffers in a write operation in accordance with one or more embodiments of the invention. As shown in FIG. 5, sub-buffers may be in an empty state (152), a loaded state (154), a complete state (156), or a written state (158). A sub-buffer is in the empty state (130) when the sub-buffer is marked as empty. Any data in a sub-buffer in the empty state (130) may be overwritten. Sub-buffers in the empty state may be transitioned to the loaded state (154) by reading data from a shared file. Specifically, a sub-buffer is in the loaded state (154) when the sub-buffer has data from the shared file and is waiting for portions of the data to be overwritten with data from a processor's address space.

When the initialization of copying data from a processor's address space occurs, the sub-buffer transitions to a complete state (156). In the complete state (156), all data required from the processor's address space is in the sub-buffer in accordance with one or more embodiments of the invention. Thus, data in a sub-buffer in the complete state (156) is waiting to be written to the shared file. In one or more embodiments of the invention, the data in the sub-buffer is written to the shared file in a unit the size of the sub-buffer. Specifically, rather than specifying each portion of the shared file that is to be overwritten from the processor's address space, the entire portion of the shared file that is covered by the sub-buffer is overwritten in accordance with one or more embodiments of the invention.

Once the data in the sub-buffer has been copied into the shared file, the sub-buffer is in a written state (158). A sub-buffer is in written state (158) when the sub-buffer is waiting to be marked as empty. After a sub-buffer in the written state (158) is marked as empty, the sub-buffer is transitioned to the empty state (152). Initializing the transition of the sub-buffers between the states may be performed by the iterators as discussed below and in FIG. 6.

Figure 6:
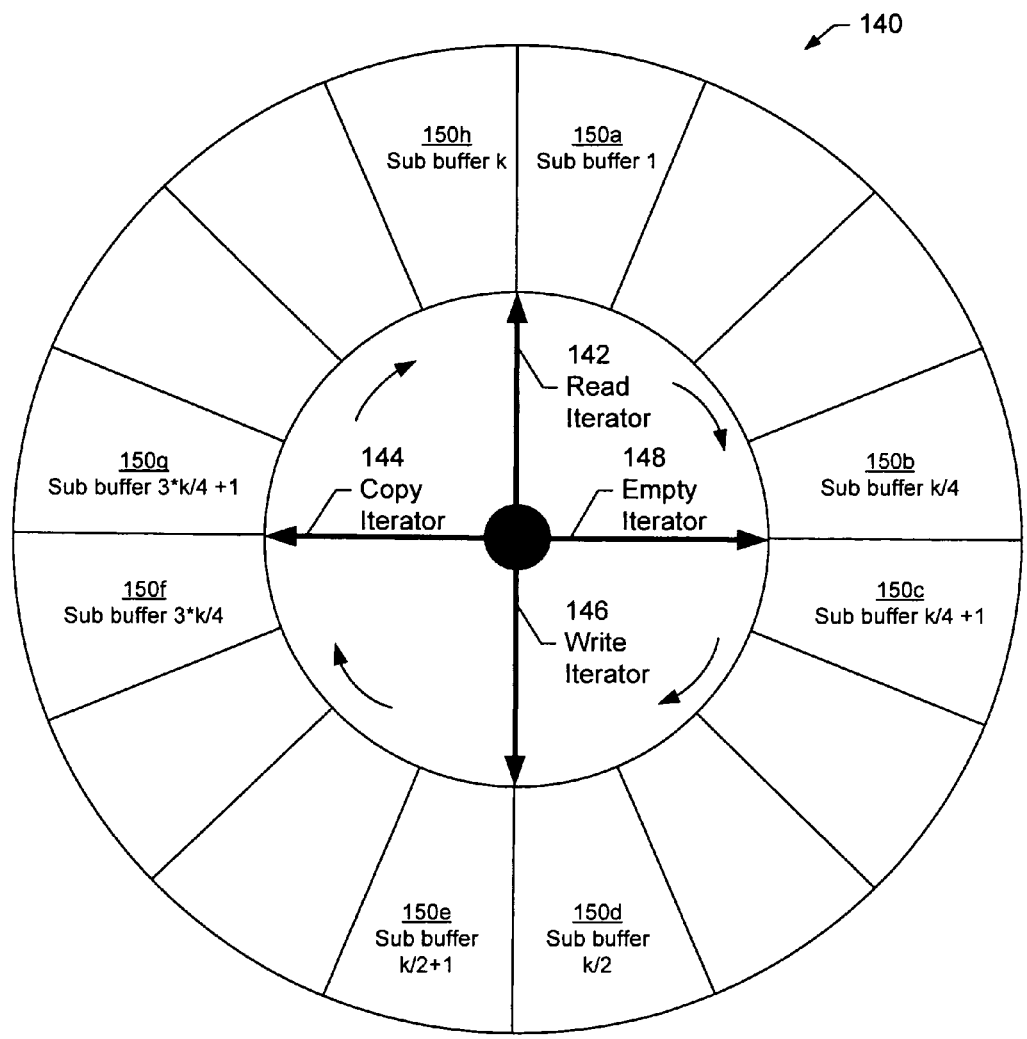

FIG. 6 shows a schematic diagram of a working buffer (140) sub-divided into k sub-buffers (150) for a write operation in accordance with one or more embodiments of the invention. The k sub-buffers (150) for the write operation may or may not correspond to the same number of sub-buffers for the read operation. In particular, the working buffer may be re-divided at each operation. For example, the working buffer may be divided into three sub-buffers during an initialization of the application phase in which processors read from a shared file and re-divided into four sub-buffers at the end of executing the application to store the result into memory.

As shown in FIG. 6, a working buffer includes multiple iterators (e.g., read iterator (142), copy iterator (144), a write iterator (146), empty iterator (148)) and sub-buffers (150a-h) in accordance with one or more embodiments of the invention. Each iterator (e.g., read iterator (142), copy iterator (144), a write iterator (146), empty iterator (148)) includes functionality to transition sub-buffers between states for a write operation.

Each sub-buffer (e.g., sub-buffer 1 (150a), sub-buffer k/4 (150b), sub-buffer k/4+1 (150c), sub-buffer k/2 (150d), sub-buffer k/2+1 (150e), sub-buffer 3*k/4 (150f), sub-buffer 3*k/4+1 (150g), sub-buffer k (150h)) corresponds to a division of the working buffer in which all memory within the sub-buffer is presumed to have the same processes being performed on the data or have been performed on the data. For example, in FIG. 6, sub-buffers between sub-buffer 3*k/4 (150f) and sub-buffer k/2+1 (150f) are presumed to have data that is in the process of copying or have just completed copying from a processor's address space. In one or more embodiments of the invention, for a write operation, four possible processes that may be performed on a sub-buffer (150a-h) are: emptying, loading, copying, and writing. A sub-buffer is emptying when the sub-buffer is waiting to receive data. A sub-buffer is loading when the sub-buffer is receiving data from the shared file. A sub-buffer is copying when the data is being copied from the processor's address space(s) to the sub-buffer. A sub-buffer is writing when data is being copied from the sub-buffer to the shared file.

Continuing with FIG. 6, the iterators (e.g., read iterator (142), copy iterator (144), a write iterator (146), empty iterator (148)) correspond to indicators of the process being performed on the sub-buffer. Each iterator includes functionality to initialize the transitioning of the sub-buffers between states. Thus, sub-buffers between the empty iterator (148) and the read iterator (142) are empty (e.g., sub-buffer 1 (150a), sub-buffer k/4 (150b)). Further, data is being loaded from the shared filed to the sub-buffers between the read iterator (142) and the copy iterator (144) (e.g., sub-buffer 3*k/4+1 (150g), sub-buffer k (150h)). Further, data is being copied from a processor's address space to the sub-buffers between the copy iterator (144) and the write iterator (146) (e.g., 3k/4 (150f), sub-buffer k/2+1 (150e)). Finally, data is being written to a shared file from the sub-buffers between the write iterator (146) and the empty iterator (148) (e.g., k/2 (150d), sub-buffer k/4+1 (150c)).

In one or more embodiments of the invention, as the iterator rotates clockwise, the next sub-buffer enters into the next state. For example, in the diagram shown in FIG. 6, in the next iteration, the read iterator (142) initializes a read on sub-buffer 1 (150a), the copy iterator (144) initializes a copy on sub-buffer 3*k/4+1 (150g), the write iterator (146) initializes a write on sub-buffer k/2+1 (150e), and the empty iterator (148) marks sub-buffer k/4+1 (150c) as empty.

In one or more embodiments of the invention, if the write operation includes only portions of the shared file covered by the sub-buffer (i.e., portions of the shared file exist that are not being over written), then data is copied from the shared file to the sub-buffer before data is copied from a processor's address space to the sub-buffer. However, if the write operation is for the entire part of the shared file covered by the working buffer, then the copy iterator (144) may not exist. Similarly, if the write operation specifies that the entire shared file covered by a particular sub-buffer is to be overwritten, then the copy to the particular sub-buffer from the shared file may also not be performed.

The diagrams shown in FIGS. 3-6 are for explanatory purposes, the actual layout of the sub-buffers may vary from the diagrams shown. In addition, rather than using the number of iterators shown in the diagram, more or fewer iterators may be used. For example, the empty iterator may not be included because an assumption may be made that when the read iterator is at a sub-buffer, the sub-buffer has been copied to the processor's address space or written to the shared file.

Moreover, a single iterator may be used. Based on the value of the single iterator, the remaining iterators may be inferred. For example, if the iterators are distributed evenly or, in a calculable manner, across the sub-buffers, then only a single iterator may be used. A calculation of the next sub-buffer to transition states for each state transition may be performed based on the single iterator. Transitioning to the next state for the next sub-buffer may be initialized for each possible state transition and the iterator may be subsequently incremented.

Furthermore, rather than having multiple sub-buffers between the iterators, a single sub-buffer between the iterators may be used. Thus, FIG. 3 may have only two or three sub-buffers and FIG. 5 may have only three or four sub-buffers. Further, if fewer iterators are used, then the state diagrams described in FIG. 4 and FIG. 6 may also change accordingly. In addition, the division of the working buffers into sub-buffers may not be even. Specifically, while FIG. 3-6 shows an even distribution of memory and sub-buffer between the iterators, the distribution may not be even. For example, during initiation, all k sub-buffers may initialize to a read. In another example, during steady state of a write operation (i.e., following initialization of the sub-buffers), sub-buffers between sub-buffer one and sub-buffer k−3 may be emptying, sub-buffer k−2 may be writing, a sub-buffer k−1 may be copying, while sub-buffer k is loading. In the example, if there are ten sub-buffers, then seven sub-buffers may be reading, one sub-buffer may be emptying, one sub-buffer may be copying, and the last sub-buffer may be writing. Thus, FIGS. 3-6 are intended for explanatory purposes only.

Figure 7:
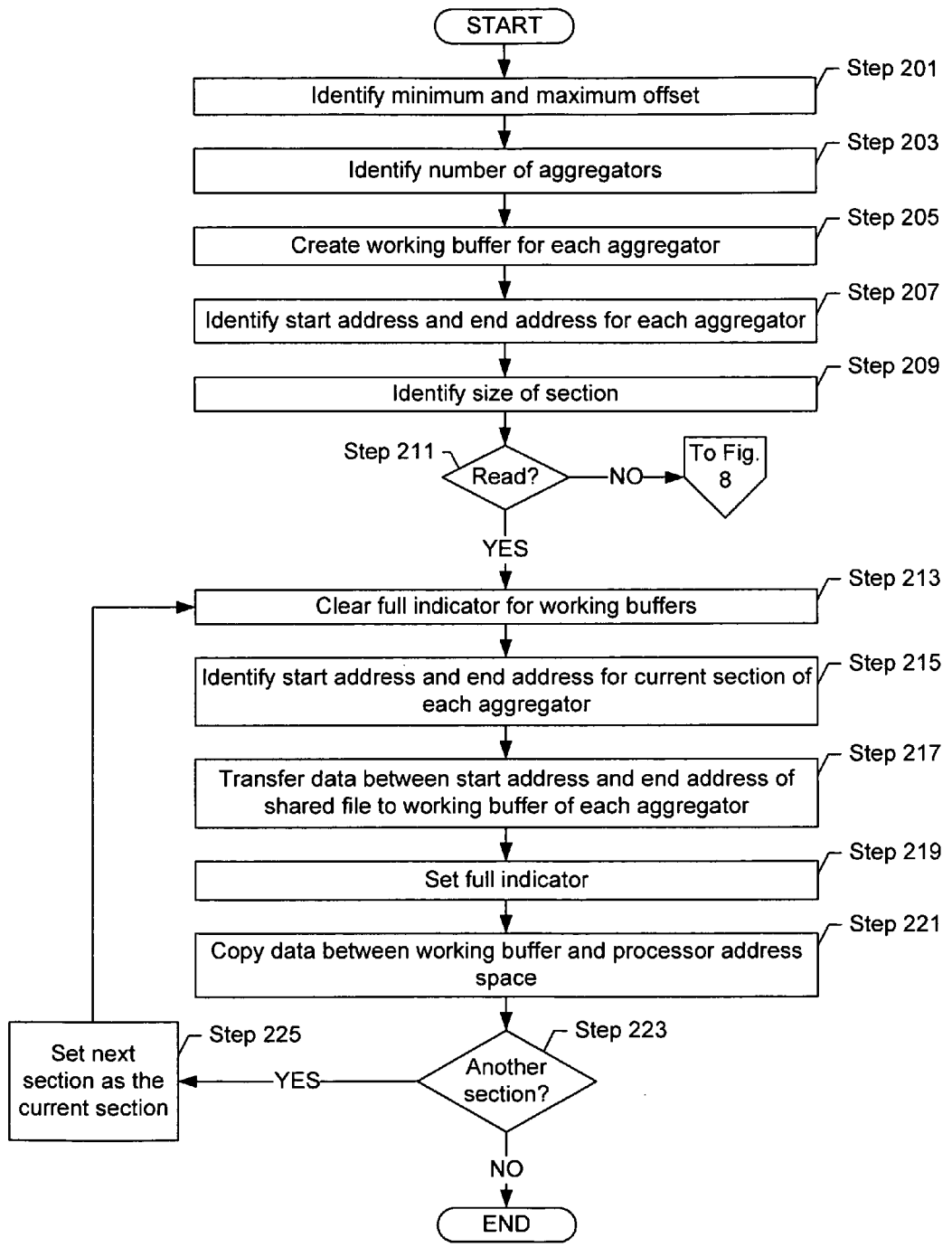
FIGS. 7-8 show flowcharts in accordance with one or more embodiments of the invention.
Figure 8:
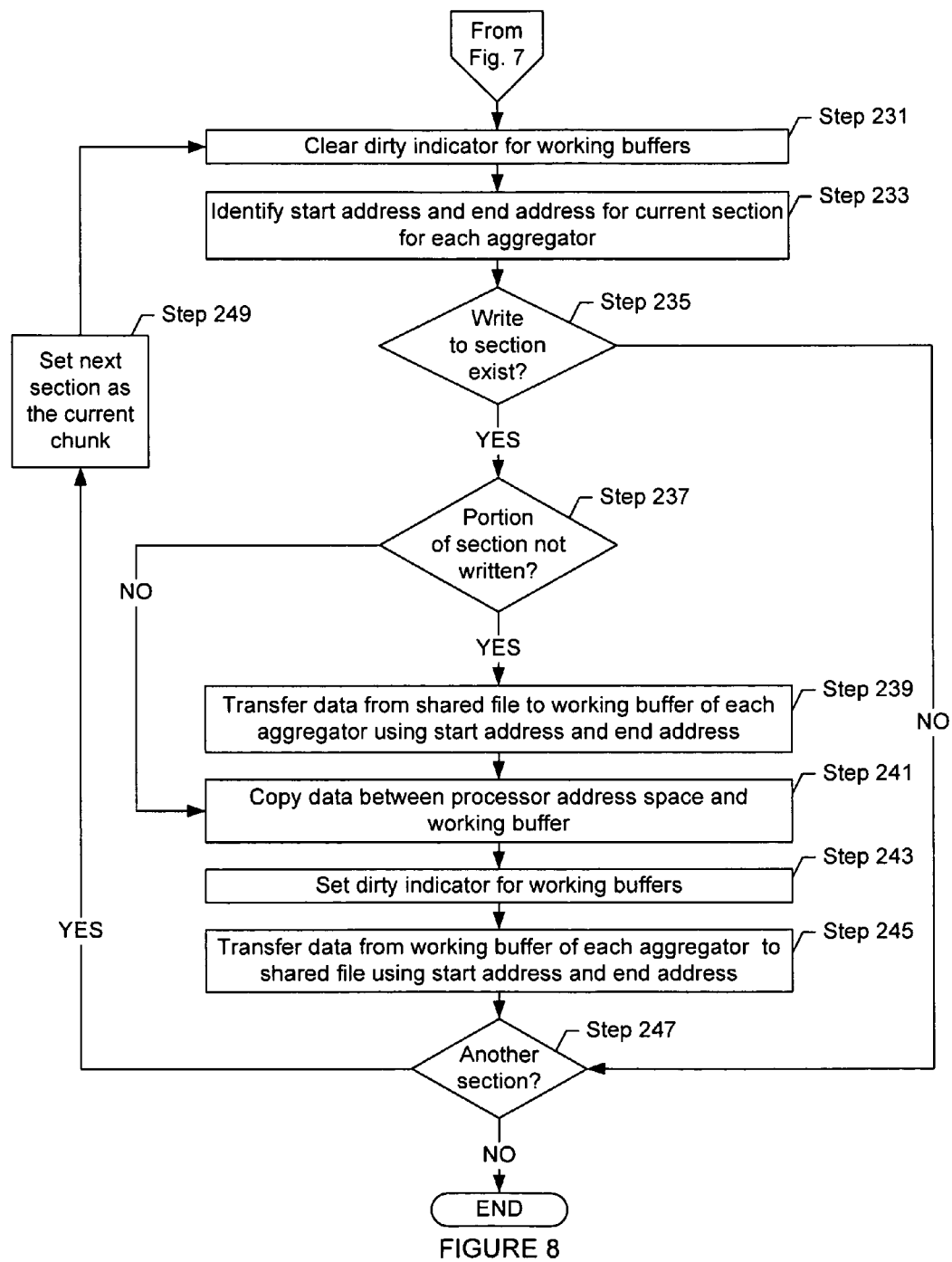

FIGS. 7-8 show flowcharts of a method for file access using a working buffer in accordance with one or more embodiments of the invention. Initially, as shown in FIG. 7, the minimum and maximum offset is identified (Step 201). The minimum offset is the minimum position in the shared file that any processor in a given multiprocessor system requires. Similarly, the maximum offset is the maximum position in the shared file that any processor in a given multiprocessor system requires. Identifying the minimum and maximum offsets may be performed by each processor when the processor determines the region of the shared file that it requires. After determining the region of the shared file required by each processor, the processors may communicate to determine the minimum and maximum offset for the file access for all processors.

Further, the number of aggregators is identified (Step 203). The number of aggregators may correspond to a configurable variable that may be received as input from a user, dependent on the difference between the minimum and maximum offset, and/or dependent on the number of processors. For example, half the processors may be designated as aggregator(s). Alternatively, a configurable variable may specify that four aggregators exist for read operations and five aggregators should be used for write operations. Based on the number of aggregators, the aggregators are designated from the processors in accordance with one or more embodiments of the invention. In particular, certain processors may be designated as aggregators.

Next, a working buffer is created for each aggregator (Step 205). At this stage, a section of shared memory may be reserved for the working buffer for each aggregator. The section of shared memory may be reserved for a time frame corresponding to a single file access, a time frame corresponding to the execution of the application by the processors, or any other time frame.

In addition to creating a working buffer, the start address and end address is identified for each aggregator (Step 207). Specifically, the difference between the maximum and minimum offset may be used to determine the size of the shared file that is being accessed. The size of the shared file that is being accessed may be divided by the number of aggregators to determine the size of the portion for which each aggregator is responsible. Specifically, each aggregator is responsible for transferring data corresponding to a portion of the shared file that is being accessed. Based on the size of the portion, a determination may be made as to the start address and end address. For example, the first aggregator may have a start address corresponding to the minimum offset and an end address corresponding to the minimum offset plus the size minus one of the portion for which the first aggregator is responsible.

As another example, consider the scenario in which a shared file includes locations 0 to 54. The minimum offset for a file access is determined to be at file location 6, the maximum offset is at file location 24, and there are three aggregators. In such an example, the difference between the minimum offset and maximum offset is 18. Thus, the size of the portion for each aggregator may be 6. Accordingly, the first aggregator may have a start address of 6 and an end address of 11, the second aggregator may have a start address of 12 and an end address of 17, and the third aggregator may have a start address of 18 and an end address of 24. Those skilled in the art will appreciate that the above example is not intended to limit the scope of the invention.

Continuing with FIG. 7, after determining the start address and end address for each aggregator, the size of each section is determined (Step 209). The size of the section is based on the amount of physical memory available in accordance with one or more embodiments of the invention. Specifically, often the amount of virtual memory specified in the file access exceeds the amount of physical memory available. In such a scenario, the portion of the shared file for which an aggregator is responsible may exceed the size of the memory reserved for the aggregator and must be further divided into sections. Each section may be stored and addressed in physical memory. Thus, file access may be performed in the sections.

Next, a determination is made whether the file access is a read instruction (Step 211). If the file access is not a read instruction, then the file access is a write instruction. Processing a write instruction is described below and in FIG. 8.

Continuing with FIG. 7, if the file access is a read instruction, then a full indicator is cleared for the working buffers (Step 213). The full indicator specifies when the data in the working buffer has the current data from the shared file. Thus, the data in the working buffer may be copied out of the working buffer into address space of one or more processors. Specifically, the full indicator specifies when the working buffer has the current data in the shared file. More specifically, the full indicator indicates when the read operation is complete.

In addition to clearing the full indicator, the start address and end address for the current section is determined for each aggregator (Step 215). Initially, the start address for the section is the start address for the portion of the shared file for which the aggregator is responsible in accordance with one or more embodiments of the invention. The end address corresponds to the start address plus the size of the section minus one.

Further, before copying the data for the section, the aggregator may first determine whether a read request exists to the current section. Determining whether a read request exists to the current section may be performed by receiving a message from each processor that specifies the portions of the shared file that the processor requires. If no processor requires data from the current section, then the current section may be skipped.

Next, data is transferred between the start address and end address of the current section of the shared file to the working buffer of each aggregator (Step 217). In one or more embodiments of the invention, the aggregator requests that all data between the start address and end address of the section is copied from the shared file. Because the entire section is specified in a single read request, fewer read requests are specified. Therefore, copying the data may be performed more quickly than copying directly only the data required by each processor's address space.

Once the transfer is complete, the full indicator may be set for the working buffer (Step 219). At this stage, data may be copied between the working buffer and each processor's address space (Step 221). Copying the data may be performed by the aggregators or the processors.

If the aggregators copy the data, then the aggregator may receive, from the processors, a list of offset, length pairs that specify the portion(s) of the shared file required by the processor and a list of the locations in the processor's shared address space where the aggregator is to store data from the shared file. The offset specifies the first address of the shared file that the processor requires and the length specifies the amount of data from the offset. In one or more embodiments of the invention, the processor transmits separate lists of the offset, length pairs to each aggregator according to the start address and end address for each aggregator. The aggregator then determines, for each section, which part of the processor's shared address space should be updated using the list. Next, the aggregator copies the data from the working buffer of the aggregator to the processor's shared address space. If multiple aggregators exist, then multiple aggregators may simultaneously copy data to the same processor's shared address space from the different sub-buffers. As an alternative to lists with offset, length pairs, the processors may send a start address and end address for each area of the shared file required by the processors.

Alternatively, if a processor copies the data, then when the full indicator is set, the aggregator may broadcast or multicast a message to the processors with an indication of the start address and an end address for the section. The processors may subsequently copy the data from the working buffers according to the start address and end address specified by the section. In one or more embodiments of the invention, multiple processors may simultaneously access and copy the data from the working buffer. When each processor has completed copying the data from the working buffer, each processor may transmit a message to the aggregator that the copy is complete. Upon receipt, the aggregator may mark the working buffer as empty.

Continuing with FIG. 7, after copying data between the working buffer and the processor's address space, a determination is made about whether another section exists (Step 223). If another section exists, then the next section is set as the current section (Step 225). Next, the full indicator for the working buffer is cleared (Step 213). Further, the start address and the end address for the current section is identified. The start address and the end address may be identified by specifying that the start address of the current section is one more than the end address of the previous section. Further, the end address of the current section is the lesser of start address plus the size of the section minus one and the end address for the aggregator.

While FIG. 7 shows a flowchart of a method for file access corresponding to a read operation with a working buffer, the read operation may be performed using sub-buffers. Specifically, the size of the section may correspond to the size of a sub-buffer. The sub-buffers may be initialized by determining the number of sub-buffers. Next, the starting sub-buffer for each iterator may be determined. Once the starting sub-buffers are determined, then the sub-buffers may be initialized as specified by each iterator. For example, a third of the sub-buffers may be marked as empty, two-thirds of the sub-buffers may have data copied from the shared file, and one half of the aforementioned two-thirds may have data copied from the sub-buffers to the processors' address spaces. After initializing the sub-buffers, then each iterator may initialize performing at least one of the Steps 213-221 on each sub-buffer until all sections are processed.

FIG. 8 shows a flowchart of a method for a file access corresponding to a write operation in accordance with one or more embodiments of the invention. Initially, the dirty indicator for the working buffers is cleared (Step 231). The dirty indicator indicates that data exists in the working buffer that has yet to be written to the file. Clearing the dirty indicator may involve, for example, changing the value of a bit associated with the working buffer.

Next, the start address and end address for the current section for each aggregator is identified (Step 233). Identifying the start address and end address may be performed in a manner similar to Step 215 of FIG. 7.

After identifying the start address and the end address, a determination is made whether a write to the section exists (Step 235). Determining whether a write to the section exists may be performed by each processor sending an offset, length pair for each write to the aggregators. Based on the offset, length pairs collected from the processors, the aggregators may determine which sections have write requests.

Alternatively, the aggregators may publicize the start address and end address of the current section. Each processor may then transmit an indication of whether the processor has a write to the section. For example, the processor may transmit a message if a write exists to the current section and/or transmit a message if no write exist to the current section.

If no write to current section exists, then the current section is skipped and a determination is made whether another section exists (Step 247). Alternatively, if a write to the section exists, then a determination is made whether a portion of the section exists that is not written (Step 237). Determining whether a portion of the section exists that is not written may be performed in a manner similar to determining whether a write to the current section exists in accordance with one or more embodiments of the invention. Specifically, the aggregators may use offset, length pairs sent from the processors to determine whether a portion of the section is not written exist. Another method may involve the processors sending a message indicating which areas of the shared file for each portion to which the processor does not write.

If a portion of the section that is not written exists, then data from the shared file is transferred to the working buffer using the start address and end address (Step 239). By transferring data to the working buffer from the shared file, the entire working buffer may be copied into the shared file with a single write request. In one or more embodiments of the invention, because each aggregator controls the copy to the sub-buffer, data may be copied to certain sub-buffers and not copied to other sub-buffers. Specifically, each aggregator may perform the above steps independent of other aggregators. Further, in one or more embodiments of the invention, data from the shared file may be transferred to the working buffer regardless of whether a portion of the current section not written exists. Data may be transferred to the working buffer using a single read operation sent to the shared file in accordance with one or more embodiments of the invention.

Once the data is transferred to the working buffer or if the entire current section is being written, then data is copied between a processor's address space and the working buffer (Step 241). Copying the data between a processor's address space and the working buffer may be performed by the processors or the aggregators.

If the processors copy the data, then each processor may receive a message from the aggregator with the start address and end address of the current section. In response to the message, each processor may copy data, in parallel, from the processor's address space to the current section. Thus, multiple processors may simultaneously copy data to the same shared working buffer.

Alternatively, the aggregators may copy data to the working buffer. Specifically, each aggregator may receive a message from the processors with an indication of the addresses that need to be copied. In response to the message, each aggregator may copy data from one or more processor shared address spaces to the working buffer. Rather than receiving messages, the aggregators may scan each processor's shared address spaces to determine which data has been modified. For example, the processor's shared address space may also include a dirty bit to indicate when data is modified. Based on the determination, the aggregators may copy data to the working buffer. In one or more embodiments of the invention, because multiple aggregators are executing in parallel, the same processor's shared address space may be simultaneously accessed by multiple aggregators.

In addition to copying the data to the working buffer, the dirty indicator is set (Step 243). The dirty indicator may be set before or after copying the data to the working buffer.

Once copying data to the working buffer is complete, data is transferred from the working buffer of each aggregator to the shared file using the start address and end address (Step 245). Specifically, the entire section is written to the shared file using a single command in accordance with one or more embodiments of the invention. In one or more embodiments of the invention, because the sections are not overlapping, multiple aggregators may simultaneously write to the shared file without first performing any common sharing method, such as acquiring a lock on the shared file or portion thereof.

Next, a determination is made about whether another section exists for which the aggregator is responsible (Step 247). If another section exists, then the next section is set as the current section (Step 249). Further, the process repeats by clearing the dirty indicator for the working buffer. Alternatively, if another section does not exist, then the processors may wait until the write is complete for all aggregators before continuing processing the application.

The steps shown in FIG. 8 may be performed using sub-buffers described in FIGS. 5 and 6. Specifically, the section size may correspond to the size of a sub-buffer. Further, a determination may be made as to an initial sub-buffer for each iterator. Next, the sub-buffers may be initialized so as to correspond to the initial position. For example, three-quarters of the sub-buffers that are contiguous in memory may have data read from the shared file. Two-thirds of the aforementioned three-quarters that have data read and are contiguous in memory may additionally have data copied from the processors' address spaces. Finally, one-half of the aforementioned two-thirds that are contiguous and have data copied from the processors' address spaces may be in the process of writing data to the shared file from the working buffer. Next, the iterators may begin transitioning the sub-buffers between states in parallel. At each time step, each iterator may process the next sub-buffer according to the type of iterator as described above and in FIGS. 5 and 6.

After the file access described in FIGS. 7 and 8 is performed. Processing by the processors may continue in parallel. Specifically, the processors may perform instructions specified by the instance of the application executing on the processor in parallel. When the processing completes, the result(s) may be transmitted to the shared memory using the working buffer as described above or using a direct transmission from one or more of the processors to the shared memory.

FIGS. 9A-9D show an example of a write operation using working buffer in accordance with one or more embodiments of the invention. Those skilled in the art will appreciate that the following examples are provided for exemplary purposes only and accordingly should not be construed as limiting the scope of the invention in any way.

In the following example, consider the scenario in which two processors (not shown) exist that each must write to an area of a shared file (300). Specifically, processor 1 must write from its address space (302) to two separate areas of the shared file (e.g., A1P1(316) and A2P1(320)), and processor 2 must write from its address space (304) to two separate areas of the shared file (A1P2 (318) and A2P2(322)).

For the above-specified write operation, a determination is made that two aggregators (not shown) are to be used. Each aggregator has a corresponding working buffer (e.g., aggregator 1 working buffer (306), aggregator 2 working buffer (308)). Further, a determination is made that the minimum offset is processor 1's write to address 1 (designated by A1P1 (316)). Similarly, the maximum offset in the write is processor 2's write to address 2 (designated as A2P2 (322)). Thus, the aggregator 1 working buffer (306) spans section 1 (i.e., S1 (310)) and the aggregator 2 working buffer (308) spans section 2 (i.e., S2 (312)). The final portion of the shared file (i.e., S3 (314)) does not have a write within the portion. Accordingly, no processor writes to area S3 (314) of the shared file.

First, in order to perform the write operation, a determination is made about whether S1 (310) and S2 (312) both have a portion that is written to and a portion that is not written to. As shown in FIG. 9B, because S1 (310) does have a portion that is written to and a portion not written to, S1 (310) is copied from the shared file (300) into aggregator 1 working buffer (306). Specifically, an aggregator (not shown) associated with aggregator 1 working buffer (306) may receive messages from processor 1 and processor 2 with the offset length pair of the writes to S1 (310). In response to the messages, the aggregator determines that a portion of S1 (310) is not written to and requests a read from the shared file (300) into aggregator 1 working buffer (306). In contrast, S2 (312) does not have a portion that is not written to, therefore no copy is required. At this stage, aggregator 1 working buffer (306) has the data from S1 (310) in the shared file (300) and aggregator 2 working buffer (308) is empty or has obsolete data.

Continuing with the example, in the next stage, data is copied from the processor's address space (e.g., processor 1 address space (302), processor 2 address space (304)) to the working buffers (e.g., aggregator 1 working buffer (306), aggregator 2 working buffer (308)) as shown in FIG. 9C in accordance with one or more embodiments of the invention. Specifically, the aggregators may each have permission to access both processor 1 address space (302) and processor 2 address space (304).

Accordingly, an aggregator associated with aggregator 1 working buffer (306) may transfer data from processor 1 address space (302) and processor 2 address space (304) to aggregator 1 working buffer (306). Similarly, an aggregator associated with aggregator 2 working buffer (308) may transfer data from processor 1 address space (302) and processor 2 address space (304) to aggregator 2 working buffer (308). Alternatively, each processor may transfer the data from the respective processor's address space (e.g., processor 1 address space (302), processor 2 address space (304)) to aggregator 1 working buffer and to aggregator 2 working buffer (308).

As shown in FIG. 9C, at the end of the data transfer, portions of aggregator 1 working buffer (306) have data from processor 1 address space (302) and processor 2 address space (304) (i.e., A1P1 (316), A1P2 (318)), while other portions in the aggregator 1 working buffer (306) have data from the shared file (300). In contrast, the entirety of aggregator 2 working buffer (308) is written with data from processor 1 address space (302) (i.e., A2P1 (320)) and processor 2 address space (304) (i.e., A2P2 (322)).

Next, the contents of aggregator 1 working buffer (306) and aggregator 2 working buffer (308) are written to the shared file (300) as shown in FIG. 9D in accordance with one or more embodiments of the invention. Because the portion of the shared file (300) in S1 (310) without a write has been first copied to the aggregator 1 working buffer (306), aggregator 1 working buffer (306) has only the most current data. Accordingly, the entire aggregator 1 working buffer (306) may be copied into the S1 (310) using a single command and overwriting any existing contents in S1 (310). In one or more embodiments of the invention, each aggregator initiates the copy from aggregator 1 working buffer (306) and aggregator 2 working buffer (308), respectively, into the shared file (300).

Figure 10:
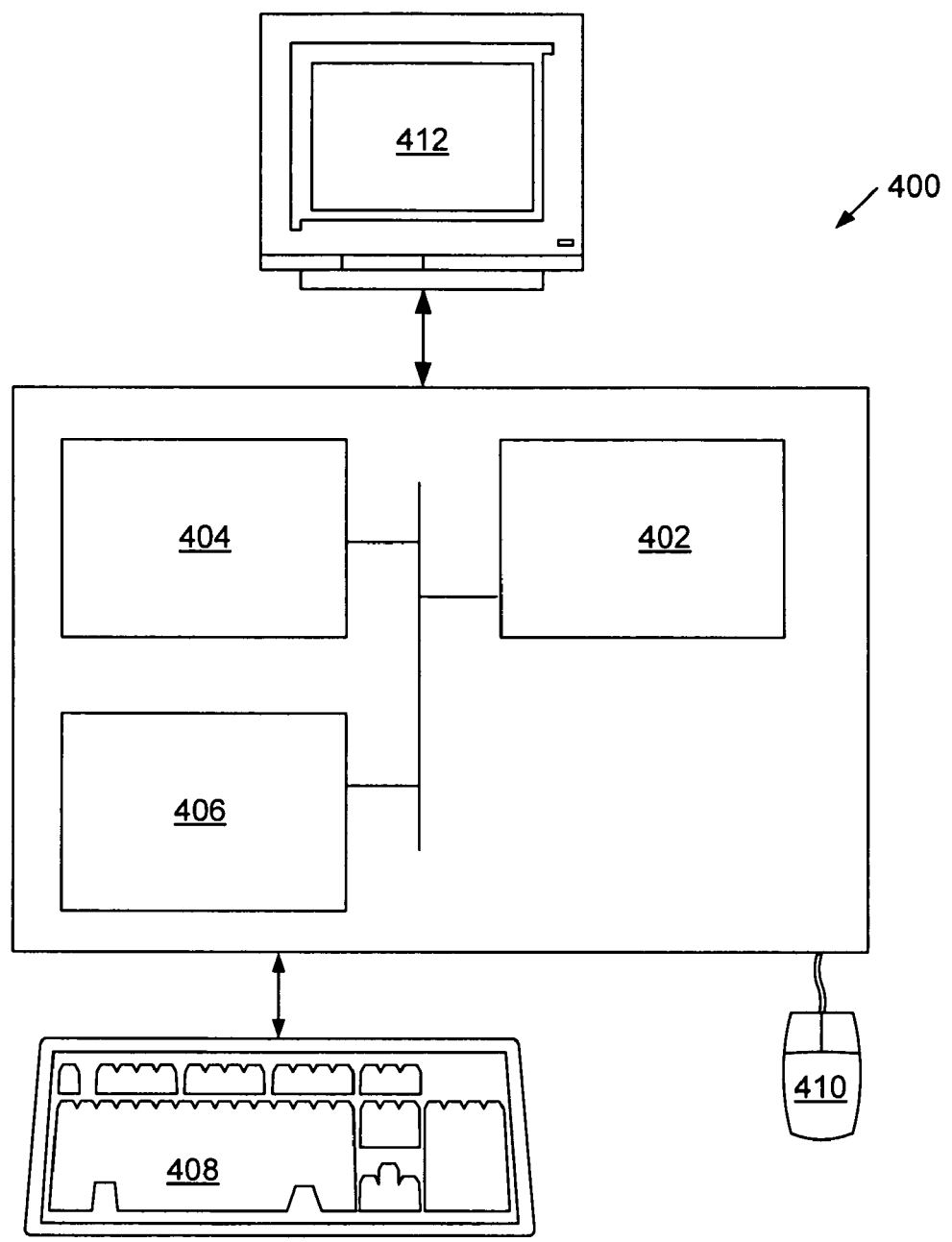
FIG. 10 shows a computer system in accordance with one or more embodiments of the invention.

Embodiments of the invention may be implemented on virtually any type of computer regardless of the platform being used. For example, as shown in FIG. 10, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of embodiments of the invention (e.g., processors, shared memory, temporary buffers, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing using a shared file comprising:
   allocating a first working buffer and a second working buffer between the shared file and a plurality of address spaces, wherein each of the plurality of address spaces is associated with one of a plurality of hardware processors;
   assigning a first contiguous portion of the shared file to a first hardware processor of the plurality of hardware processors, wherein the first hardware processor is configured to access each of the plurality of address spaces, and
   assigning a second contiguous portion of the shared file to a second hardware processor of the plurality of hardware processors, wherein the second hardware processor is configured to access each of the plurality of address spaces,
   assigning the first working buffer to the first hardware processor and the second working buffer to the second hardware processor;
   copying first data directly from the first contiguous portion of the shared file to the first working buffer by the first hardware processor;
   copying the first data directly from the first working buffer to the plurality of address spaces by the first hardware processor;
   copying second data directly from the second contiguous portion of the shared file to the second working buffer by the second hardware processor;
   copying the second data directly from the second working buffer to the plurality of address spaces by the second hardware processor;
   processing the first data and the second data, in parallel, by the plurality of hardware processors associated with the plurality of address spaces to obtain a result, wherein the plurality of hardware processors directly access data from the plurality of address spaces; and
   storing the result in shared memory,
   wherein at least one of the plurality of addresses spaces comprises data copied from both the first working buffer and the second working buffer.

2. The method of claim 1, wherein storing the result in shared memory comprises:
   copying the result from the plurality of address spaces to the first working buffer by the first hardware processor; and
   copying the result from the first working buffer to the shared file by the first hardware processor.

3. The method of claim 1, wherein the plurality of address spaces are overlapping.

4. The method of claim 1, wherein the first data is copied in sections, wherein at least one section comprises data for at least two hardware processors of the plurality of hardware processors, and wherein the sections are determined by the size of physical memory.

5. The method of claim 1, wherein the first working buffer is arranged as a ring buffer divided into a plurality of sub-buffers.

6. The method of claim 5, wherein a first portion of the first data is copied, by a read iterator, into a first sub-buffer of the plurality of sub-buffers while a second portion of first the data is copied, by a copy iterator, from a second sub-buffer of the plurality of sub-buffers, and
   wherein, at each timestep, the read iterator and the copy iterator each iterate by a single next sub-buffer of the plurality of sub-buffers.

7. The method of claim 1, further comprising:
   identifying a global address range for the first data;
   identifying a number of aggregators, wherein the first hardware processor is one of the number of aggregators; and
   partitioning the global address range by dividing the global address range by the number of aggregators.

8. The method of claim 1, wherein the first data for each of the plurality of hardware processors associated with the plurality of address spaces is stored in interleaving portions of the shared file.

9. The method of claim 1, wherein the plurality of hardware processors associated with the plurality of address spaces execute a common application to process the first data.

10. A method for processing using a shared file comprising:
    allocating a first working buffer and a second working buffer between the shared file and a plurality of address spaces, wherein each of the plurality of address spaces is associated with one of a plurality of hardware processors;
    assigning a first contiguous portion of the shared file to a first hardware processor of the plurality of hardware processors, wherein the first hardware processor is configured to access each of the plurality of address spaces, and assigning a second contiguous portion of the shared file to a second hardware processor of the plurality of hardware processors, wherein the second hardware processor is configured to access each of the plurality of address spaces, assigning the first working buffer to the first hardware processor and the second working buffer to the second hardware processor;

copying first data directly from the first contiguous portion of the shared file to first working buffer by the first hardware processor;

copying the first data directly from the first working buffer to the plurality of address spaces by the plurality of hardware processors associated with the plurality of address spaces;

copying second data directly from the second contiguous portion of the shared file to the second working buffer by the second hardware processor;

copying the second data directly from the second working buffer to the plurality of address spaces by the plurality of hardware processors associated with the plurality of address spaces;

processing the first data and the second data, in parallel, by the plurality of hardware processors associated with the plurality of address spaces to obtain a result, wherein the plurality of hardware processors directly access data from the plurality of address spaces; and storing the result in shared memory, wherein at least one of the plurality of addresses spaces comprises data copied from both the first working buffer and the second working buffer.

11. The method of claim 10, wherein storing the result in shared memory comprises:

copying the result from the plurality of address spaces to the first working buffer by the plurality of hardware processors associated with the plurality of address spaces; and copying the result from the first working buffer to the shared file by the first hardware processor.

12. The method of claim 10, wherein the plurality of address spaces are overlapping.

13. The method of claim 10, wherein the first working buffer is arranged as a ring buffer divided into a plurality of sub-buffers.

14. The method of claim 13, wherein a first portion of the first data is copied, by a read iterator, into a first sub-buffer of the plurality of sub-buffers while a second portion of the first data is copied, by a copy iterator, from a second sub-buffer of the plurality of sub-buffers, and wherein, at each timestep, the read iterator and the copy iterator each iterate by a single next sub-buffer of the plurality of sub-buffers.

15. The method of claim 10, further comprising:
identifying a global address range for the first data;
identifying a number of aggregators, wherein the first hardware processor is one of the number of aggregators; and
partitioning the global address range by dividing the global address range by the number of aggregators.

16. The method of claim 10, wherein the first data for each of the plurality of hardware processors associated with the plurality of address spaces is stored in interleaving portions of the shared file.

17. A computer readable storage comprising computer readable program code for causing a shared memory computer system to:

allocate a first working buffer and a second working buffer between a shared file and a plurality of address spaces, wherein each of the plurality of address spaces is associated with one of a plurality of hardware processors;

assigning a first contiguous portion of the shared file to a first hardware processor of the plurality of hardware processors, wherein the first hardware processor is configured to access each of the plurality of address spaces, and assigning a second contiguous portion of the shared file to a second hardware processor of the plurality of hardware processors, wherein the second hardware processor is configured to access each of the plurality of address spaces, assigning the first working buffer to the first hardware processor and the second working buffer to the second hardware processor;

copy first data directly from at least two of the plurality of address spaces to the first working buffer by the plurality of hardware processors associated with the plurality of address spaces;

copy second data directly from at least two of the plurality of address spaces to the second working buffer by the plurality of hardware processors associated with the plurality of address spaces;

copy the first data directly from first working buffer to the first contiguous portion of the shared file by the first hardware processor; and copy the second data directly from second working buffer to the second contiguous portion of the shared file by the second hardware processor, wherein both the first working buffer and the second working buffer comprises data copied from one of the plurality of address spaces.

18. The computer program product of claim 17, wherein the first working buffer is arranged as a ring buffer divided into a plurality of sub-buffers, wherein, a first portion of the first data is copied, by a read iterator, into a first sub-buffer of the plurality of sub-buffers while a second portion of the first data is copied, by a copy iterator, from a second sub-buffer of the plurality of sub-buffers, and wherein, at each timestep, the read iterator and the copy iterator each iterate by a single next sub-buffer of the plurality of sub-buffers.

19. The method of claim 6, wherein, while the read iterator copies the first portion of the first data into the first sub-buffer and the copy iterator copies the second portion of first data from the second sub-buffer, a empty iterator marks a third sub-buffer of the plurality of sub-buffers as empty, and wherein, at each timestep, the empty iterator iterates by the single next sub-buffer of the plurality of sub-buffers.

* * * * *